United States Patent

[11] 3,620,660

| [72] | Inventor | Jacques Laurent<br>Sainte-Foy-les-Lyon, France |
|---|---|---|
| [21] | Appl. No. | 878,402 |
| [22] | Filed | Nov. 20, 1969 |
| [45] | Patented | Nov. 16, 1971 |
| [73] | Assignee | Application Des Gaz<br>Paris, France |
| [32] | Priority | Nov. 29, 1968 |
| [33] | | France |
| [31] | | 50694 |

[54] LIGHTING DEVICES FOR GAS BURNERS
5 Claims, 3 Drawing Figs.

[52] U.S. Cl. .................................................. 431/255,
431/344
[51] Int. Cl. ..................................................... F23q 3/00
[50] Field of Search ............................................ 431/254,
255, 344

[56] References Cited
UNITED STATES PATENTS
| 3,172,456 | 3/1965 | Glasgow et al. ................ | 431/255 X |
| 3,344,835 | 10/1967 | Hodgson ....................... | 431/255 X |

Primary Examiner—Edward G. Favors
Attorney—Alexander & Dowell

ABSTRACT: A lighting device associated to a burner operating with a gas under pressure is actuated by the pressure of the gas supplied to the burner in order that the latter may be lighted automatically. In an embodiment the gas under pressure is supplied to the burner through a main gas valve, a throttling device being inserted between the valve and the throttling device. The movable actuating member of a piezoelectric lighting device receives the action of a deformable diaphragm which closes an open-ended pneumatic chamber the latter being connected with the gas conduit at a point thereof situated between the gas valve and the throttling device. The gas burner is thus automatically lighted when the valve is turned on.

PATENTED NOV 16 1971 3,620,660

INVENTOR.
Jacques Laurent
BY
Alexander Nowell
attorneys

LIGHTING DEVICES FOR GAS BURNERS

The present invention relates to lighting devices for burners operating with a combustible gas under pressure, and more particularly to such devices which comprise a lighting mechanism including a spark producing member and a mechanical gearing adapted to act on the said member. The spark producing member is preferably formed of a piezoelectric crystal which generates a high-voltage pulse whenever it is suddenly submitted to a mechanical stress, as for instance to a sudden blow. But the said member may also be formed of a flint cooperating with an appropriate friction wheel.

These lighting devices will be thereafter referred to as of the spark-producing type.

It has already been proposed to combine such a lighting device with a gas burner, the lighting mechanism of the device being connected with the actuating member of the gas valve of the burner in such manner as to be operated whenever the valve is turned on. But with such an arrangement the actuation of the gas valve necessitates a substantial effort and if the said valve is operated too rapidly, the spark or sparks may occur before the combustible gas issues from the burner.

The present invention has for its object to provide a process by means of which the above disadvantages may be avoided.

It is also an object of the present invention to provicde a lighting device of the kind in question for a burner operating with a combustible gas under pressure, which will operate automatically without requiring any effort from the operator.

A further object of the present invention is to provide a lighting device of the spark-producing type for a burner operating with a combustible gas under pressure wherein the production of the spark or sparks is automatically delayed with respect to the opening of the valve of the gas burner.

Still another object of the invention is to provide a gas burner and lighting device unit wherein the flame of the burner will last during a noticeable time after the valve which controls the supply of combustible gas to the burner is closed.

In accordance with the invention a process for operating the actuating mechanism of a lighting device of the spark-producing type for a burner operating with a combustible gas under pressure, consists in using for this purpose the pressure of the said gas in order that the burner may be automatically lighted when the gas is supplied thereto.

The present invention also concerns a lighting device for a burner operating with a combustible gas under pressure, of the kind comprising a lighting mechanism including a spark producing member and a mechanical gearing adapted to act on the said member, wherein the said lighting mechanism is actuated by pneumatic means receiving the gas under pressure supplied to the burner.

Figures 1, 2, 3:
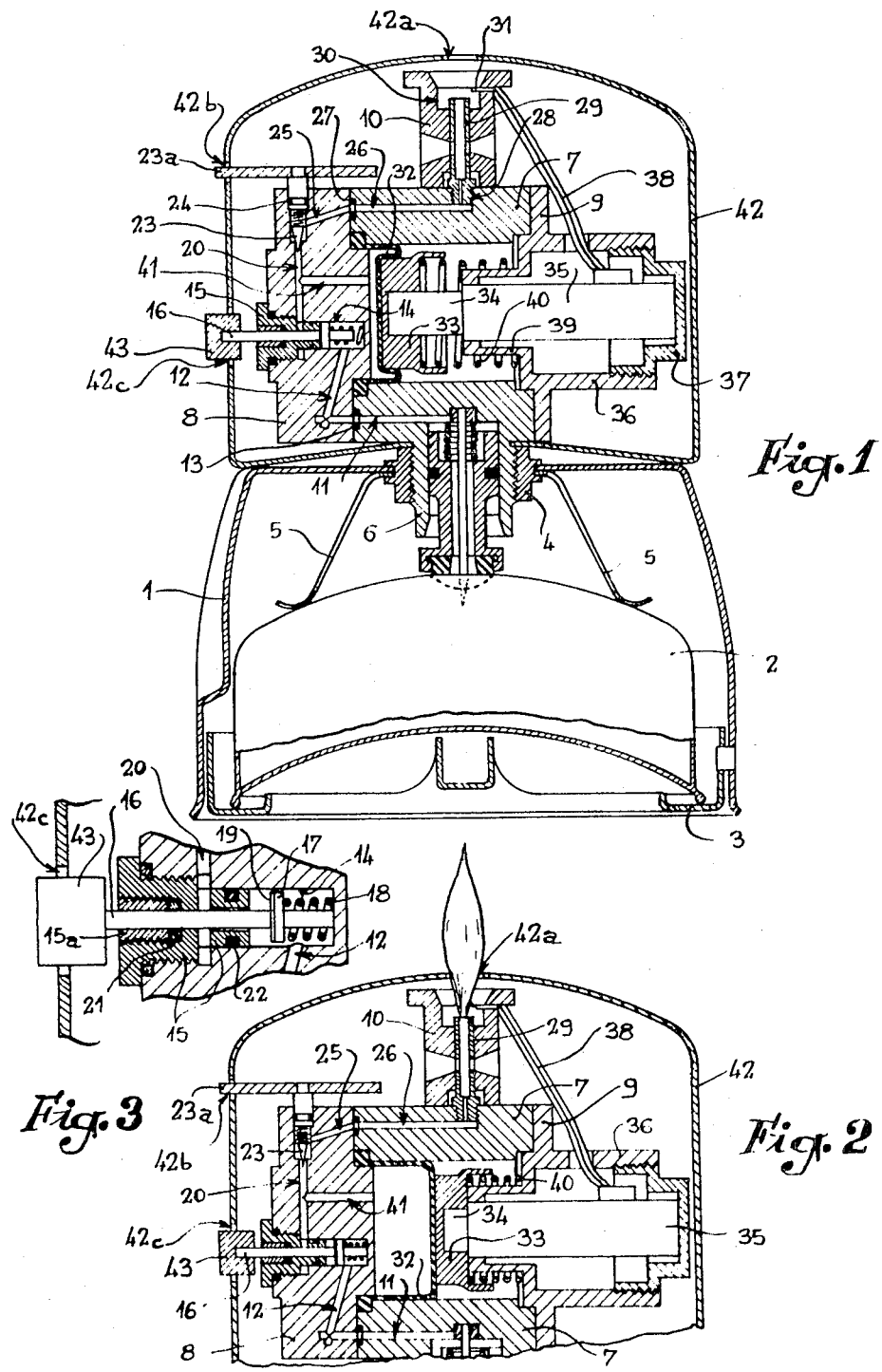
FIG. 1 is a general vertical section of a cigarette lighter comprising a lighting device according to the invention, the parts being illustrated at their inoperative position.
FIG. 2 is a fragmental section similar to FIG. 1, but showing the parts at their operative position.
FIG. 3 illustrates to an enlarged scale a portion of FIG. 1.

The cigarette lighter shown in FIG. 1 comprises a hollow bell-shaped base 1 in which is disposed a cartridge 2 filled with a liquefied combustible gas, this cartridge being maintained by a lower cover 3 which is itself secured to the base by means of a bayonet joint. The upper wall of the base carries an axial vertical sleeve 4 provided with downwardly directed resilient blades 5 which maintain the cartridge 2 applied against the cover 3. This sleeve 4 has a screw-threaded bore adapted to receive a gas intake head 6 provided with appropriate means for perforating the cartridge 2 while forming a gastight seal around the perforation. This head may be established in accordance with U.S. Pat. No. 2,853,126.

The gas intake head 6 is integral with a thick-walled horizontal cylinder 7, one end of which is closed by a massive cover 8, while its other end receives a flange 9 adapted to carry a piezoelectric lighting mechanism, cover 8 and flange 9 being secured to cylinder 7 by appropriate screws, not illustrated. The cylinder 7 further carries an upper vertical sleeve 10 adapted to form part of the burner of the lighter, as explained below. This sleeve 10 is coaxial with the gas intake head 6.

A radial conduit 11 is formed in the gas intake head 6 and in the massive cover 8. This conduit opens into another conduit 12 provided in the cover 8. An annular seal 13 is disposed in a recess of the gas intake head 6 in order to prevent any gas leakage around the conduit 11 between the said head and the cover 8. The conduit 12 opens into a blind horizontal bore 14 (FIG. 3) provided in the cover, the open end of this bore, of larger diameter, receiving an axially perforated plug 15. This plug supports a slidable rod 16 which carries at its inner end a flat gas valve 19 adapted to cooperate with the inner end of the said plug 15 under the action of a compression spring 18 disposed around the slidable rod 16 between the valve 17 and the closed inner end of the bore. The valve 17 is provided with a plastic sealing disc 19 in order to realize a fully gastight closure. When the rod is pushed against the action of its loading spring 18, as illustrated in FIG. 3, the gas from the gas intake head 6 flows through conduits 11 and 12, and through the annular clearance between rod 16 and plug 15, until it reaches a vertical conduit 20, any leakage being prevented by a sealing ring 21 compressed by a tubular screw 15a screwed into an enlarged outer portion of the axial perforation or bore provided in plug 15 for passage of rod 16.

The above-mentioned conduit 20 opens upwardly in the form of an enlarged screw-threaded hole which receives a needle valve 23 provided with an O-ring 24, the outer end of this needle valve carrying a flat circular actuating knob 23a. This needle valve 23 is thus interposed between the said conduit 20 and another conduit 25 which communicates with a conduit 26 provided in the upper portion of the wall of the cylinder 7, an annular seal 27 preventing any leakage between the cylinder and its cover. The conduit 26 opens in turn into a vertical blind bore 28 in which is screwed a metallic tubular gas nozzle 29. The upper sleeve 10 above referred to is mounted with a force fit on this nozzle. It is made of an electrically insulating material and it is formed with an upper cup-shaped recess 30 in which the upper end of the nozzle 29 projects slightly, as shown.

A metallic sparking electrode 31 is disposed in the lateral wall of the upper recess 30, slightly above the upper end of the nozzle 29.

A deformable cup-shaped diaphragm 32 has its edge clamped between the cover 8 and the corresponding end of the cylinder 7. The central portion of this diaphragm is applied against an actuating head 33 carried by the movable rod 34 of the piezoelectric mechanism 35. Such mechanisms being well known in the art, it is unnecessary to describe the inner details thereof for a clear understanding of the present invention. It is sufficient to remark that such a mechanism may comprise a piezoelectric crystal, a movable hammer adapted to strike this crystal in order to generate a high-voltage electric pulse, spring means acting on the hammer to urge it towards the crystal, detent means which retain the hammer while the spring means are being stressed by the actuating member (head 33 and rod 34), until the latter reaches the end of its actuating stroke, and returning spring means to return the parts towards their initial position after each operation. In the present case the piezoelectric mechanism 35 is mounted in a cylindrical body 36 which is integral with the above-mentioned flange 9 and it is retained therein by a plug 37 screwed in the open outer end of this body. Its high-voltage cable 38 passes through an orifice provided in the lateral wall of the said body 36 and it is connected with the sparking electrode 29. The inner end of this body 36 is of somewhat smaller diameter, as indicated at 39, and it plays the role of a centering member for a compression spring 40 interposed between the body and the actuating head 33, the said spring forming the above-mentioned returning spring means of the piezoelectric mechanism. The space delimited between the diaphragm 32 and the cover 8 communicates with the conduit 20 through a horizontal conduit 41.

The whole unit comprising the gas intake head 6 and the parts which it supports is enclosed within a casing 42 having an upper opening 42a disposed above the gas nozzle 29, a lateral slot 42b for passage of a portion of the periphery of the actuating knob 23a, and an orifice 42c in which is disposed a pushbutton 43 carried by the outer end of the rod 16.

The operation is as follows:

When the pushbutton 43 is actuated, the gas valve 17 opens and the gas under pressure from the cartridge 2 flows through conduits 11, 12, 25 and 26, its flow rate being adjusted at will by means of the needle valve 23. The gas then passes through the nozzle 29. But another portion of the gas supplied to the burner from the gas intake head 6 flows through the conduit 41 and therefore acts on the deformable diaphragm 32. Owing to the gas pressure, this diaphragm is pushed towards the right in FIGS. 1 and 2 against the reaction of spring 40 and it therefore actuates the actuating head 33 and the movable rod 34 of the piezoelectric mechanism 35. At the end of the stroke of the rod, the piezoelectric mechanism 35 generates a high-voltage pulse which produces a spark between the electrode 31 and the end of the nozzle 29. Since during the displacement of the actuating head 33 the combustible gas has reached the said nozzle and formed a jet of gas and air within the upper recess 30, this spark lights the said jet. The length of the resulting flame may be adjusted at will by means of the knob 23a. FIG. 2 shows the position of the parts at the end of the lighting operation.

When the pushbutton 43 is released, the gas flow from the gas intake head is interrupted. The returning spring 40 then returns the actuating head 33 towards its initial position, the gas which filled the space comprised between the diaphragm and the cover exhausting through the conduit 41 into the conduit 20 and finally through the nozzle 29, thus maintaining the flame for a short time after the pushbutton has been released. The length of this time is of course dependent of the adjustment of the needle valve 23, i.e. of the length of the flame. With a long flame, requiring a relatively important flow rate, the said time is short, while with a short flame corresponding to a small flow rate, this time may be relatively long.

The nozzle 29 may be in the form of a mere tube having a calibrated orifice at its lower end, or it may be provided with lateral air intake holes, as illustrated, the insulating sleeve 10 being of course formed with corresponding perforations.

It is to be noted that the needle valve 23 is situated downstream with respect to the conduit 41 through which gas under pressure is supplied to the space delimited by the deformable diaphragm 32 and the cover 8, in such a manner that the pressure drop determined by this valve has no influence on the operation of the actuating head 33.

More generally when the circuit of the gas between the main gas valve and the outlet of the burner comprises a throttling passage or other pressure-reducing means, it is of advantage to derive the gas for the pneumatic means downstream of the main gas valve but upstream of the said pressure reducing means.

In a modification (not illustrated) the main gas valve may simultaneously control two outlet conduits, namely a first one for the burner and a second one for the pneumatic means.

I claim:

1. A device for the automatic lighting of an apparatus operating with a combustible gas under pressure, comprising in combination:

a gastight chamber, including at least one movable wall to provide a variable capacity, restoring means tending to continually bring said movable wall back to a position in which the chamber capacity is reduced, gas release means for controlling the gas flowing towards a burner outlet, a first conduit connecting said gas release means with said chamber, a second conduit having at least one throttling part of smaller section than the smallest section of said first conduit, continuously connecting said first conduit and said chamber with said burner outlet, a lighting device of the spark-producing type, and kinematic means connecting said movable wall with said lighting device, in order to produce the lighting spark near said burner outlet, when, owing to the opening of said gas release means, the pressure in said chamber increases and shifts said movable wall against said restoring means.

2. In a device as set forth in claim 1, said spark-producing lighting device being of the piezoelectric type.

3. In a device as set forth in claim 1, said movable wall of the variable-capacity chamber being constituted by a diaphragm.

4. In a device as set forth in claim 1, said movable wall of the variable-capacity chamber being constituted by a piston.

5. In a device as set forth in claim 1, the smallest section of said second conduit being determined by an adjustable throttling device.

* * * * *